(12) United States Patent
Droste

(10) Patent No.: US 7,073,608 B2
(45) Date of Patent: Jul. 11, 2006

(54) POWER TOOL

(75) Inventor: Manfred Droste, Limburg-Offheim (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/692,359

(22) Filed: Oct. 23, 2003

(65) Prior Publication Data

US 2004/0134673 A1 Jul. 15, 2004

(30) Foreign Application Priority Data

Oct. 23, 2002 (GB) .................................. 0224640

(51) Int. Cl.
*B25D 17/00* (2006.01)

(52) U.S. Cl. ...................... 173/109; 173/104; 173/114; 173/218

(58) Field of Classification Search .................. 173/13, 173/48, 104, 109, 114, 176, 178, 216
See application file for complete search history.

(56) References Cited

U.S. PATENT DOCUMENTS

| | | | |
|---|---|---|---|
| 1,937,965 A | 12/1933 | Johnson | |
| 3,809,168 A | 5/1974 | Fromm | |
| 3,874,460 A * | 4/1975 | Schmid et al. ............... | 173/109 |
| 3,924,955 A | 12/1975 | Barnett et al. | |
| 3,931,744 A | 1/1976 | Wunsch | |
| 4,069,855 A | 1/1978 | Petroshanoff | |
| 4,088,197 A * | 5/1978 | Roll et al. .................... | 173/178 |
| 4,129,188 A | 12/1978 | El-Souessi et al. | |
| 4,229,981 A | 10/1980 | Macky | |
| 4,274,304 A * | 6/1981 | Curtiss ........................ | 475/270 |
| 4,397,061 A | 8/1983 | Kanzaka | |
| 4,567,950 A | 2/1986 | Fushiya et al. | |
| 4,640,478 A | 2/1987 | Leigh-Monstevens | |
| 4,658,912 A | 4/1987 | Rohm | |
| 4,732,217 A | 3/1988 | Bleicher et al. | |
| 4,871,033 A | 10/1989 | Odoni et al. | |
| 4,895,212 A | 1/1990 | Wache | |
| 5,373,905 A * | 12/1994 | Bleicher et al. ............. | 173/109 |
| 5,531,278 A * | 7/1996 | Lin .............................. | 173/176 |
| 5,588,496 A * | 12/1996 | Elger .......................... | 173/178 |
| 5,704,433 A * | 1/1998 | Bourner et al. ............... | 173/48 |
| 2002/0003044 A1 | 1/2002 | Funfer | |

FOREIGN PATENT DOCUMENTS

| | | |
|---|---|---|
| EP | 1 157 791 A | 11/2001 |
| GB | 1441467 A | 6/1976 |
| GB | 2324485 A | 10/1998 |

* cited by examiner

*Primary Examiner*—Louis K. Huynh
*Assistant Examiner*—Chukwurah Nathaniel
(74) *Attorney, Agent, or Firm*—Michael P. Leary; Charles E. Yocum; Adan Ayala

(57) ABSTRACT

A portable tool comprising a spindle defining a longitudinal axis, a spring extending around the spindle in the axial direction for biasing a component of the tool, a stop ring extending around the spindle and against which the spring bears. The spindle includes a plurality of circumferentially spaced radially outward projections and the stop ring includes on its internal surface a corresponding plurality of recesses extending from the bearing face of the stop ring to an opposite face, and a corresponding plurality of pockets open at the opposite face. During assembly, the stop ring is fitted over the spindle or sleeve by the passing the recesses over the projections and then rotating the stop ring to align the pockets with projections. The stop ring is axially fixed on the spindle by the pockets engaging the projections under the biasing force from the spring.

15 Claims, 2 Drawing Sheets

POWER TOOL

This invention relates to hand-held powered tools, in particular electrically powered tools having a rotatingly driven spindle for driving a tool or bit.

BACKGROUND OF THE INVENTION

Many types of hand held power tools are known which have a rotatingly driven spindle via which a tool or bit is rotatingly driven. One example of such a power tool is a rotary hammer having a hollow spindle within which an air cushion hammering mechanism is at least partly located.

Rotary hammers are known which have a housing and a hollow cylindrical spindle rotatably mounted in the housing. The spindle allows insertion of the shank of a tool or bit, for example a drill bit or a chisel bit, into the front end thereof so that it is retained in the front end of the spindle with a degree of axial movement. The spindle may be a single cylindrical part or may be made of two or more cylindrical parts, which together form the hammer spindle. For example, a front part of the spindle may be formed as a separate tool holder body for retaining the tool or bit. Such hammers are generally provided with an impact mechanism which converts the rotational drive from an electric motor to a reciprocating drive causing a piston, which may be a hollow piston, to reciprocate within the spindle. The piston reciprocatingly drives a ram by means of a closed air cushion located between the piston and the ram. The impacts from the ram are transmitted to the tool or bit of the hammer, optionally via a beatpiece.

Rotary hammers are known which can be employed in combination impact and drilling mode or in a drilling only mode in which the spindle, or a forwardmost part of the spindle, and hence the bit inserted therein will be caused to rotate. In the combination impact and drilling mode the bit will be caused to rotate at the same time as the bit receives repeated impacts. Such rotary hammers generally have a hammer only mode in which the spindle is locked against rotation.

Some rotary hammers include an overload clutch in the drive train for rotatingly driving the spindle. One design of overload clutch comprises a drive gear which extends co-axially around the spindle or around a mode change sleeve rotatingly fixed on the spindle. The drive gear can be rotatingly driven by an intermediate shaft, which intermediate shaft is driven by the motor of the hammer. The drive gear rotatingly drives the spindle via a set of ratchet teeth, which are engageable with opposing ratchet teeth formed on the spindle or alternatively on the mode change sleeve. The drive gear is axially biased to engage the opposing sets of ratchet teeth by a spring. An axial end stop is required, either around the spindle or around the mode change sleeve, against which the spring bears in order to axially bias the drive gear. The end stop is generally provided by a washer, which washer is maintained in its axial position by a circlip which extends around an annular recess formed in the external surface of the spindle or the mode change sleeve.

Where such a mode change sleeve is used, the mode change sleeve is generally axially slideably mounted on the spindle. A mode change mechanism acts on the mode change sleeve to move it axially, to move the drive gear mounted on the mode change sleeve into and out of engagement with an intermediate shaft depending on whether rotary drive to the spindle is required. To simplify the mode change mechanism, a spring may be used, to bias the mode change sleeve into its position in which the drive gear engages the intermediate shaft, then the mode change mechanism need only move the mode change sleeve axially in one direction, to move the drive gear out of engagement with the intermediate shaft with the spring acting to return the mode change sleeve to its position in which the drive gear and the intermediate shaft are engaged. Again, an axial end stop is required around the spindle against which the spring bears in order to axially bias the mode change sleeve. The end stop is generally provided by a washer, which washer is maintained in its axial position by a circlip which extends around an annular recess formed in the external surface of the spindle.

The problem with circlips is that they are difficult to correctly assemble onto the hammer spindle or mode change sleeve. If the circlip is not correctly assembled then the axial stop is not effective and the hammer will not operate correctly. Also, if the circlip is not correctly assembled it is likely to come loose and this is likely to cause damage to the hammer when it is first used.

Similar overload clutches to those discussed above can be used on other types of hand held power tools, such as drilling machines, where the clutch extends around the spindle. Again the use of circlips in such overload clutches can give rise to the problems discussed above.

BRIEF DESCRIPTION OF THE INVENTION

The present invention aims to provide a hand held power tool in which the number of circlips used is reduced and in which assembly of the power tool is significantly improved.

According to the present invention there is provided a hand-held powered tool comprising a housing;
a spindle mounted within the housing, which spindle has a longitudinal axis;
a spring member for applying a biasing force in the direction of the axis to a component of the tool; and
an end stop ring which extends around the spindle for providing a bearing surface against which the spring member bears, which end stop ring is axially fixed on the spindle or on a cylindrical sleeve which extends around the spindle;
characterised in that the spindle or sleeve comprises a plurality of circumferentially spaced radially outwardly extending projections and the end stop ring is formed on its internal surface with a corresponding plurality of recesses extending from the bearing face of the end stop ring to an opposite face of the end stop ring and with a corresponding plurality of pockets open at the opposite face, arranged such that the end stop ring is fitted over the spindle or sleeve by the projections passing through the recesses and such that the end stop ring is fixed on the spindle by the pockets engaging the projections under the biasing force from the spring member.

Therefore, the present invention provides an end stop around the spindle for a spring member to bear against, without using a circlip. The end stop ring according to the present invention acts as an end stop for the spring member and itself forms part of the axially fixing of itself with respect to the spindle. This axial fixing is maintained by the axial biasing force of the spring member, without requiring any additional components.

The spindle may be rotatingly mounted within the housing and the power tool may be provided with a spindle drive train for transmitting rotary drive to the spindle, in which case the component of the power tool to which the spring member applies a biasing force may be a driving gear or a driven gear of an overload clutch via which rotational drive is transmitted from the spindle drive train to the spindle. Thus, rotary drive is transmitted from the spindle drive train to the driving gear of the overload clutch and below a predetermined torque threshold the rotary drive is transmitted from the driving gear to the driven gear of the overload clutch and by the driven gear to the spindle. In this case the end stop ring, spring member and driving gear may be mounted on the cylindrical sleeve and the cylindrical sleeve may be formed as the driven gear of the overload clutch. The spring member biases the driving gear into a rotatingly driving engagement with the cylindrical sleeve. Where the tool is a rotary hammer, the cylindrical sleeve may be rotationally fixedly mounted on the spindle and axially slideable on the spindle so as to move the driving gear of the overload clutch into and out of engagement with the spindle drive train in order to change the mode of operation of the hammer. The driving gear and driven gear of the overload clutch may be formed with opposing sets of ratchet teeth which are biased into engagement by the spring member.

In one design of the end stop arrangement, each projection may be part of an axially extending rib. A gap may formed across each rib so as to separate each rib into an axially forward portion forming the projection and a rearward portion. The spring member may extend around the spindle and may be a helical spring.

The hand held power tool may be a rotary hammer, in which case the spindle is a hollow spindle rotatingly mounted within the hammer housing and a hammering mechanism is at least partially located within the spindle for generating repeated impacts on a tool or bit mounted at the forward end of the spindle.

The component of the rotary hammer to which the spring member applies a biasing force may alternatively be a slider sleeve which forms part of a mode change mechanism of the hammer for selectively transmitting to rotary drive to the spindle. Where the hammer is provided with a spindle drive train for transmitting rotary drive to the spindle, the slider sleeve may be rotationally fixedly and axially slideably mounted on the spindle and a spindle drive gear may be mounted on the slider sleeve, arranged such that in a first axial position of the slider sleeve the spindle drive gear engages the spindle drive train to transmit rotary drive via the slider sleeve to the spindle and is a second axial position of the slider sleeve the spindle drive gear disengages the spindle drive train to disconnect rotary drive to the spindle.

The present invention also provides a method of assembling a power tool as described above, comprising the steps of:

circumferentially aligning the recesses in the end stop ring with the projections on the spindle or sleeve;

passing the end stop ring over the projections against the biasing force of the spring member so that the recesses pass completely over the projections;

rotating the end stop ring about the spindle or sleeve so as to circumferentially aligning the pockets in the end stop ring with the projections; and releasing the end stop ring to axially fix the end stop ring on the spindle by the pockets engaging the projections under the biasing force from the spring member.

This method of assembly is straightforward and does not involve the assembly of small and difficult to assemble parts such as circlips.

BRIEF DESCRIPTION OF THE DRAWINGS

An embodiment of a rotary hammer according to the present invention will now be described by way of example, with reference to the accompanying drawings in which.

DETAILED DESCRIPTION OF THE INVENTION

Figure 1:
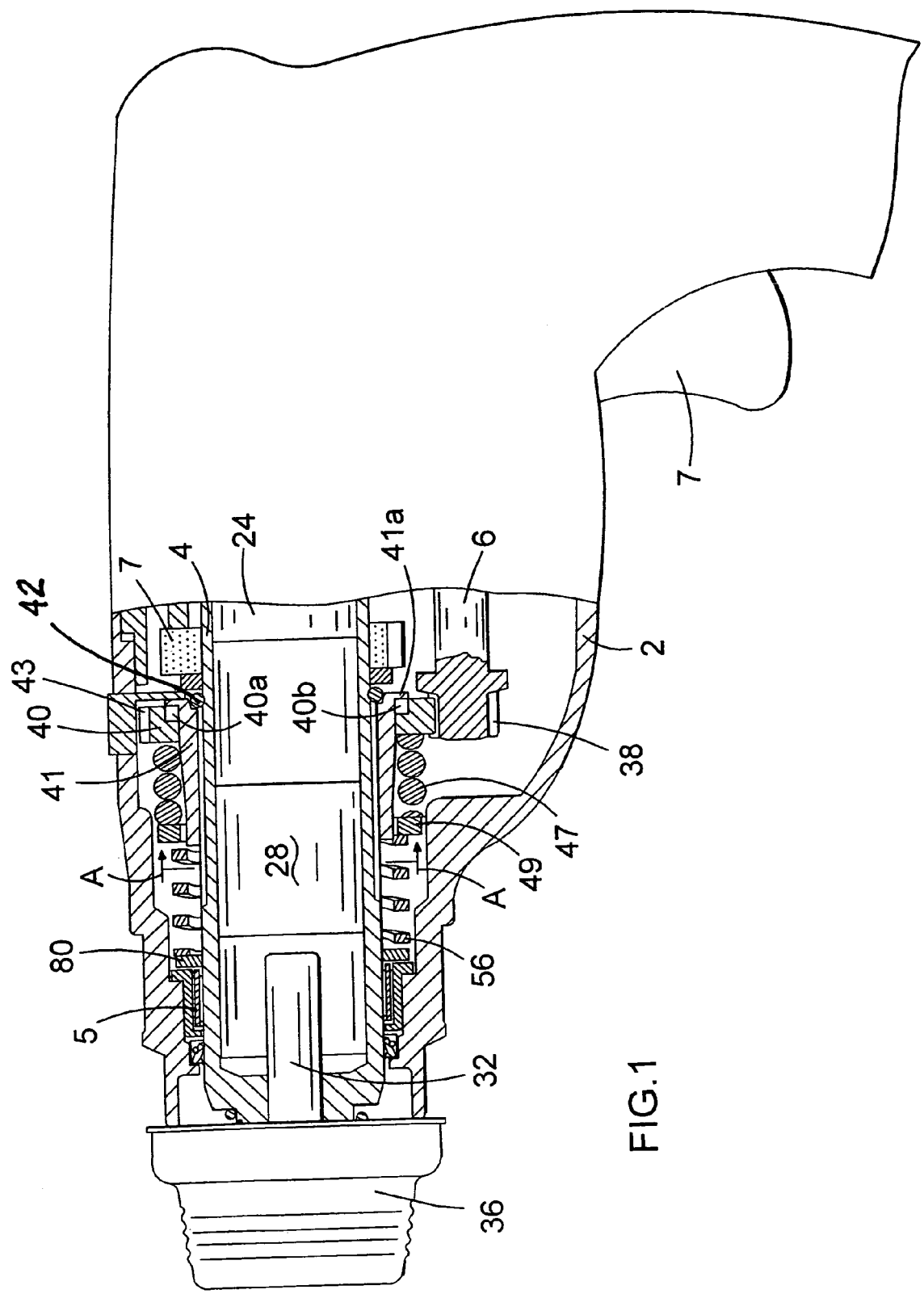
FIG. 1 is a partially cut away side cross-sectional elevation of a rotary hammer according to the present invention.
Figure 2:
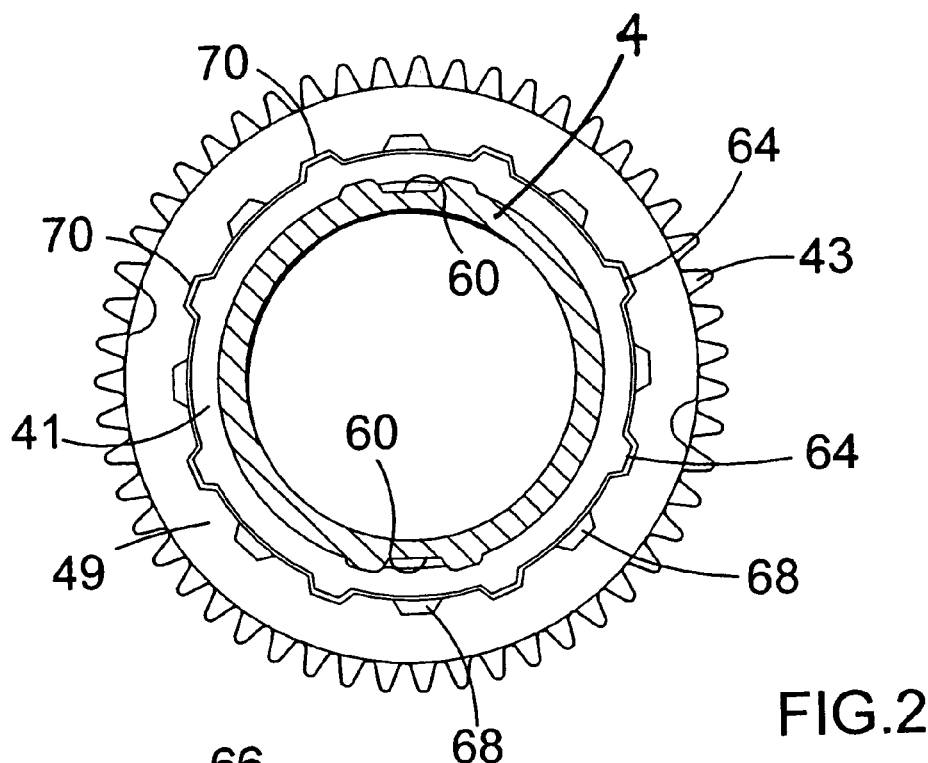
FIG. 2 is a transverse cross-section through line AA of FIG. 1.

The rotary hammer has a forward portion which is shown in cross-section in FIG. 1 and a rearward portion incorporating a motor and a pistol grip rear handle (shown cut away), in the conventional way. Alternatively, the handle may be of the D-handle type. The handle portion incorporates a trigger switch (7) for actuating the electric motor, which motor is formed at the forward end of its armature shaft with a pinion. The pinion of the motor rotatingly drives an intermediate shaft (6) via a gear which gear is press fit onto the rearward end of the intermediate shaft (6). The intermediate shaft is rotatingly mounted in the housing (2) of the hammer via a pair of bearings (not shown).

A wobble drive hammering mechanism, of a type that is well known in the art, is provided for reciprocatingly driving a piston (24). The piston (24) is slideably located within the hollow cylindrical spindle (4) and an O-ring seal is mounted around the piston (24) so as to seal between the periphery of the piston (24) and the internal surface of the spindle (4). A ram (28) is slideably mounted within the spindle (4) and an O-ring seal is mounted around the ram (28) so as to seal between the periphery of the ram (28) and the internal surface of the spindle (4). During normal operation of the hammer, a closed air cushion is formed between the forward face of the piston (24) and the rearward face of the ram (28) and so the ram is reciprocatingly driven by the piston via the closed air cushion. During normal operation of the hammer the ram (28) repeatedly impacts a beatpiece (32), which beatpiece is reciprocatingly mounted within the spindle (4). The beatpiece (32) transfers impacts from the ram (28) to a tool or bit (not shown) mounted within a forward tool holder portion of the spindle (4) by a tool holder arrangement (36), of a type known in the art. The tool or bit is releasably locked within the tool holder portion of the spindle (4) so as to be able to reciprocate within the tool holder portion of the spindle by a limited amount.

The spindle (4) is rotatably mounted in the hammer housing (2) via bearings (5, 7). Simultaneously with, or as an alternative to, the hammering action generated by the hammering mechanism described above, the spindle (4) can be rotatingly driven by the intermediate shaft (6), as described below. Thus, as well as reciprocating, the tool or bit can be rotatingly driven because it is non-rotatably mounted within the spindle by the tool holder arrangement (36).

Figure 4:
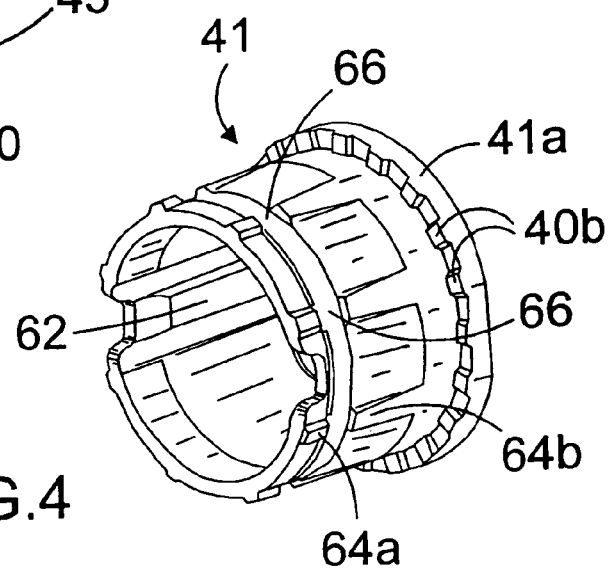
FIG. 4 is a perspective view of the mode change sleeve which forms the base for the spindle clutch sub-assembly of FIG. 3.

A spindle drive gear (40) is rotatably and axially slideably mounted on a mode change sleeve (41). The mode change sleeve (41) is non-rotatably and axially slideably mounted on the spindle (4) via two axially extending recesses (60) formed in the external surface of the spindle (4) engaging cooperating axially extending splines (62) formed on the internal surface of the mode change sleeve (41). The spindle drive gear is formed on its periphery with a set of teeth (43). The intermediate shaft (6) is formed at its forward end with a pinion (38) and the teeth (43) of the spindle drive gear may be brought into engagement with the pinion (38) in order to transmit rotary drive to the mode change sleeve (41) and thereby to the spindle (4). The spindle drive gear (40) transmits rotary drive to the slider sleeve (41) via an overload clutch arrangement. The spindle drive gear (40) has a set of rearwardly facing ratchet teeth (40a) formed on the rearward half of its radially inward facing face. This set of teeth is biased into engagement with a set of opposing forwardly facing ratchet teeth (40b) formed on an annular flange (41a) of the mode change sleeve (41), as shown in FIG. 4. The sets of ratchet teeth are biased into engagement with each other by a clutch spring (47), which spring is mounted on the mode change sleeve (41) to extend between an end stop ring (49) axially fixedly mounted at the forward end of the slider sleeve (41) and the forward facing face of the spindle drive gear (40).

Figure 3:
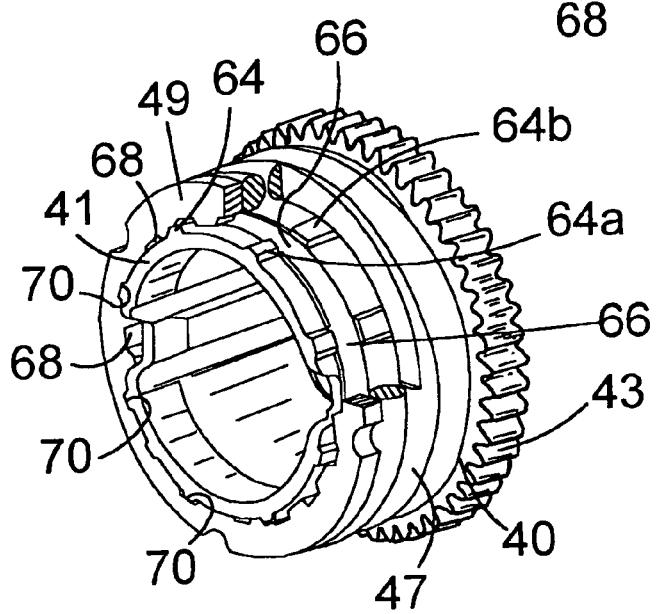
FIG. 3 is a partially cut away perspective view of the spindle clutch sub-assembly of the hammer of FIG. 1.

The mode change sleeve (41) is formed with a set of axially extending ribs (64) on its external surface. A gap (66) is formed across each rib (64) a short distance rearwardly of the forward end of the mode change sleeve, to separate the rib into a forward portion (64a) and a rearward portion (64b), as shown in FIGS. 3 and 4. The end stop ring (49) is formed with a corresponding plurality of axially extending recesses (68) in its radially inwardly directed face, which recesses (68) extend from the front face to the rear face of the end stop ring (49). In addition the end stop ring (49) is formed with a corresponding plurality of pockets (70), formed in its radially inward directed face, but of limited axial length. The pockets (70) are open at the forward directed face of end stop ring (49), but closed at the rearward directed face. The pockets (70) and recesses (68) alternate circumferentially around the inner diameter of the end stop ring (49).

Therefore, in order to assemble the spindle clutch sub-assembly of FIG. 3, the spindle drive gear (40) is mounted on the mode change sleeve (41) from the front until the spindle drive gear (40) abuts the flange (41a) of the mode change sleeve. Then the spring (47) is mounted on the mode change sleeve (41) from the front. After this, the end stop ring (49) in mounted on the mode change sleeve (41) by aligning the recesses (68) in the end stop ring (49) with the ribs (64) of the mode change sleeve (41). The end stop ring (49) is pushed rearwardly on the mode change sleeve (41) against the biasing force of the spring (47) until the end stop ring (49) lies radially outwardly of the gaps (66) in the ribs (64). The end stop ring (49) is then rotated, to align the forwardly open pockets (70) of the end stop ring with the forward portions (64a) of the ribs (64). Then the end stop ring is released and the spring (47) urges the end stop ring forwardly so that the rearward edge of each forward rib portions (64a) abut the base of the corresponding pocket (70). The engagement of the forward rib portions (64a) within the pockets (70) axially and rotationally fixes the end stop ring (49) and the biasing force of the spring (47) maintains the engagement of the forward rib portions (64a) within the pockets (70). This attachment of the end stop ring (49) to the mode change sleeve (41) is achieved without the use of circlips and requires no additional components. The attachment requires only the formation of the ribs (64) on the mode change sleeve (41) and the recesses (68) and pockets (70) on the end stop ring (49). In addition the assembly of the end stop ring (49) on the mode change sleeve (41) can be reliably achieved by the simple steps set out above.

With the mode change sleeve (41) in the position shown in FIG. 1, when the torque required to rotationally drive the spindle (4) is below a predetermined threshold, the spring (47) biases the sets of opposing ratchet teeth (40a, b) on the spindle drive gear (40) and the slider sleeve (41) into engagement. With the sets of ratchet teeth engaged, rotation of the intermediate shaft (6) rotationally drives the spindle drive gear (40) via pinion (38), the spindle drive gear (40) rotationally drives the slider sleeve (41) via the interlocking ratchet teeth and the slider sleeve (41) rotationally drives the hollow cylindrical spindle (4) on which it is non-rotatably mounted. However, when the torque required to rotationally drive the spindle (4) exceeds a predetermined torque threshold the spindle drive gear (40) can move forwardly along the slider sleeve (41) against the biasing force of the spring (47). Thus, the spindle drive gear (40) begins to slip relative to the slider sleeve (41) and the sets of opposing teeth (40a, 40b) ratchet over each other, and so the rotary drive from the spindle drive gear (40) is not transmitted to the spindle (4). The ratcheting of the sets of teeth (40a, 40b) makes a noise which alerts the user of the hammer to the fact that the overload clutch arrangement (40, 41, 47) is slipping.

The mode change sleeve (41) is axially biased by a spring (56) into a rearward position, as shown in FIG. 1, against an axial stop formed by circlip (42), which circlip is mounted in a recess formed in the external surface of the spindle (4). In the rearward position of the slider sleeve (41), the hammer is in a rotary mode and rotation from the intermediate shaft (6) will be transmitted to the spindle (4), provided the torque transmitted is below the threshold torque of the overload clutch. The slider sleeve (41) can be moved into a forward position against the biasing force of the spring (56) via a mode change mechanism. In the forward position the spindle drive gear (40) is moved on the slider sleeve (41) forwardly out of engagement with the intermediate shaft pinion (38) and into engagement with a spindle lock arrangement (not shown). With the slider sleeve (41) and spindle drive gear in a forward position, the hammer is in a non-rotary mode with the spindle (4) fixed against rotation.

The spring (56) bears at its forward end against a second end stop ring (80) and the second end stop ring (80) can be axially and rotationally fixedly attached to the spindle by the same type of attachment as between the first end stop ring (49) and the mode change sleeve (41). Thus, the spindle is formed with a plurality of ribs corresponding to the ribs (64) formed on the mode change sleeve (41) and the second end stop ring (80) is formed with a corresponding plurality of pockets and recesses corresponding to the pockets (70) and recesses (68) formed on the first end stop ring (49). The spring (56) maintains the attachment between the ribs on the spindle and the pockets in the second end stop ring (80) in the same way as the spring (47) maintains the attachment between the ribs (64) on the mode change sleeve (41) and the pockets (70) in the first end stop ring (49).

Accordingly, the form of attachment described in detail above in relation to the first end stop ring (49) and the mode change sleeve (41) can be used for other end stops rings extending around the spindle of a power tool, which end stop rings form an end stop against which an axially extending spring bears. The springs (47, 56) for maintaining the attachment of the end stop rings (49, 80) are helical springs which extend around the spindle, however, as an alternative the helical springs could be replaced be one or more conical springs which extend around the spindle.

What is claimed is:

1. A hand-held powered tool comprising:
   a housing;
   a spindle mounted within the housing and having a longitudinal axis;
   a spring member for applying a biasing force in the direction of the axis to a first component of the tool; and
   a stop ring extending around the spindle for providing a bearing surface against which the spring member bears, the stop ring axially fixed on one of the spindle and a cylindrical sleeve which extends around the spindle;
   characterised in that the spindle or sleeve includes a plurality of circumferentially spaced radially outwardly extending projections and the stop ring includes on its internal surface a corresponding plurality of recesses extending from a bearing face of the stop ring to an opposite face of the stop ring and with a corresponding plurality of pockets open at the opposite face, arranged such that the stop ring is fitted over the spindle or sleeve by the projections passing through the recesses and such that the stop ring is fixed on the spindle by the pockets engaging the projections (64) under the biasing force from the spring member.

2. A tool according to claim 1 and further comprising a drive train mounted in the housing and drivingly engageable with the spindle and the spindle is rotatably mounted within the housing.

3. A tool according to claim 2 wherein the component of the power tool to which the spring member applies a biasing force is a gear of an overload clutch which is drivably connectable to the spindle.

4. A tool according to claim 3 wherein the stop ring, spring member and driving gear are mounted on the cylindrical sleeve and the cylindrical sleeve is formed as a driven gear of the overload clutch.

5. A tool according to claim 4 wherein the cylindrical sleeve is rotationally fixedly mounted on the spindle and is axially slideable on the spindle so as to move the driving gear of the overload clutch into and out of engagement with the spindle drive train in order to change the mode of operation of the tool.

6. A tool according to claim 1 wherein each projection is part of an axially extending rib.

7. A tool according to claim 6 wherein a gap is formed across each rib so as to separate each rib into an axially forward portion forming the projection and a rearward portion.

8. A tool according to claim 1 wherein the spring member extends around the spindle.

9. A tool according to claim 1 wherein the spring member is a helical spring.

10. A tool according to claim 1 wherein the tool is a rotary hammer, the spindle is hollow and the hammer additionally comprises a hammering mechanism at least partially located within the spindle for generating repeated impacts on a tool or bit mounted at a forward end of the spindle.

11. A hammer according to claim 10 wherein the component of the hammer to which the spring member applies a biasing force is a slider sleeve which forms part of a mode change mechanism of the hammer for selectively transmitting rotary drive to the spindle.

12. A hammer according to claim 11 wherein a spindle drive train is provided for transmitting rotary drive to the spindle, the slider sleeve is rotationally fixedly and axially slideably mounted on the spindle and a spindle drive gear is mounted on the slider sleeve, arranged such that in a first axial position of the slider sleeve the spindle drive gear engages the spindle drive train to transmit rotary drive via the slider sleeve to the spindle and in a second axial position of the slider sleeve the spindle drive gear disengages the spindle drive train to disconnect rotary drive to the spindle.

13. A method of assembling a tool comprising the steps of:
   providing components for assembly including:
      a generally cylindrical first component, the first component including a radially outward stop at a first axial position on the first component and a plurality of circumferentially spaced radially outwardly extending projections at a second axial position on the first component;
      an annular drive gear;
      a spring member having a first end and a second end;
      a stop ring having an internal surface, the internal surface defining a plurality of recesses corresponding to the plurality of projections, the recesses extending from a first face of the stop ring to an opposite face of the stop ring, the internal surface also defining a plurality of pockets, the pockets open to the opposite face of the stop ring,
   installing the annular drive gear around the first component and adjacent to the radially outward stop;
   installing the spring member around the first component with the first end toward the drive gear and the second end toward the projections;
   circumferentially aligning the recesses in the stop ring with the projections on the first component;
   passing the stop ring over the projections and compressing the spring member so that the recesses pass completely over the projections;
   rotating the stop ring about the first component so as to circumferentially align the pockets in the stop ring with the projections; and
   releasing the stop ring to axially fix the stop ring on the first component by the pockets engaging the projections under the biasing force from the spring member.

14. A hand-held powered tool comprising:
   a housing;
   a spindle mounted within the housing and defining a longitudinal axis; the spindle including a plurality of circumferentially spaced and radially outwardly extending projections
   a movable component axially movably mounted to the spindle;
   a stop ring connectable around the spindle and including a radially inner face, a bearing face, and a second face axially opposite to the bearing face,
   a spring located between the bearing face of the stop ring and the movable component and applying an axial biasing force to the moveable component and the stop ring; and
   wherein the stop ring defines;
   a plurality of recesses located in the radially inner face of the stop ring, the recesses extending axially and open at the bearing face and open at the second face, and slidable over the projections of the spindle during assembly of the power tool; and
   a plurality of pockets located in the radially inner face of the stop ring and open at the second face and engageable with the projections of the spindle such that the stop ring is fixed on the spindle under the biasing force applied by the spring.

15. A method of assembling a tool comprising the steps of:
   providing components for assembly including:
      a spindle defining a longitudinal axis and including a plurality of circumferentially spaced and radially outwardly extending projections;
      a movable component;

a stop ring connectable around the spindle and including a radially inner face, a bearing face, and a second face axially opposite to the bearing face, the stop ring defining a plurality of recesses located in the radially inner face of the stop ring, the recesses extending axially and open at the bearing face and open at the second face; and a spring having a first end and a second end;

mounting the movable component on the spindle;

mounting the spring so that the first end of the spring will exert a bias force against the movable component when assembly is complete;

circumferentially aligning the recesses in the stop ring with the projections on the spindle;

passing the stop ring over the projections in a first axial direction so that the recesses pass completely over the projections;

rotating the stop ring about the spindle so as to circumferentially aligning the pockets in the stop ring with the projections;

moving the stop ring in a second axial direction; and engaging the pockets of the stop ring with the projections of the spindle so as to fix the stop ring on the spindle under a biasing force exerted by the second end of the spring when assembly is complete.

* * * * *